Dec. 8, 1964      D. T. AYERS, JR      3,159,975
BRAKE OPERATING MECHANISM
Filed Feb. 3, 1964
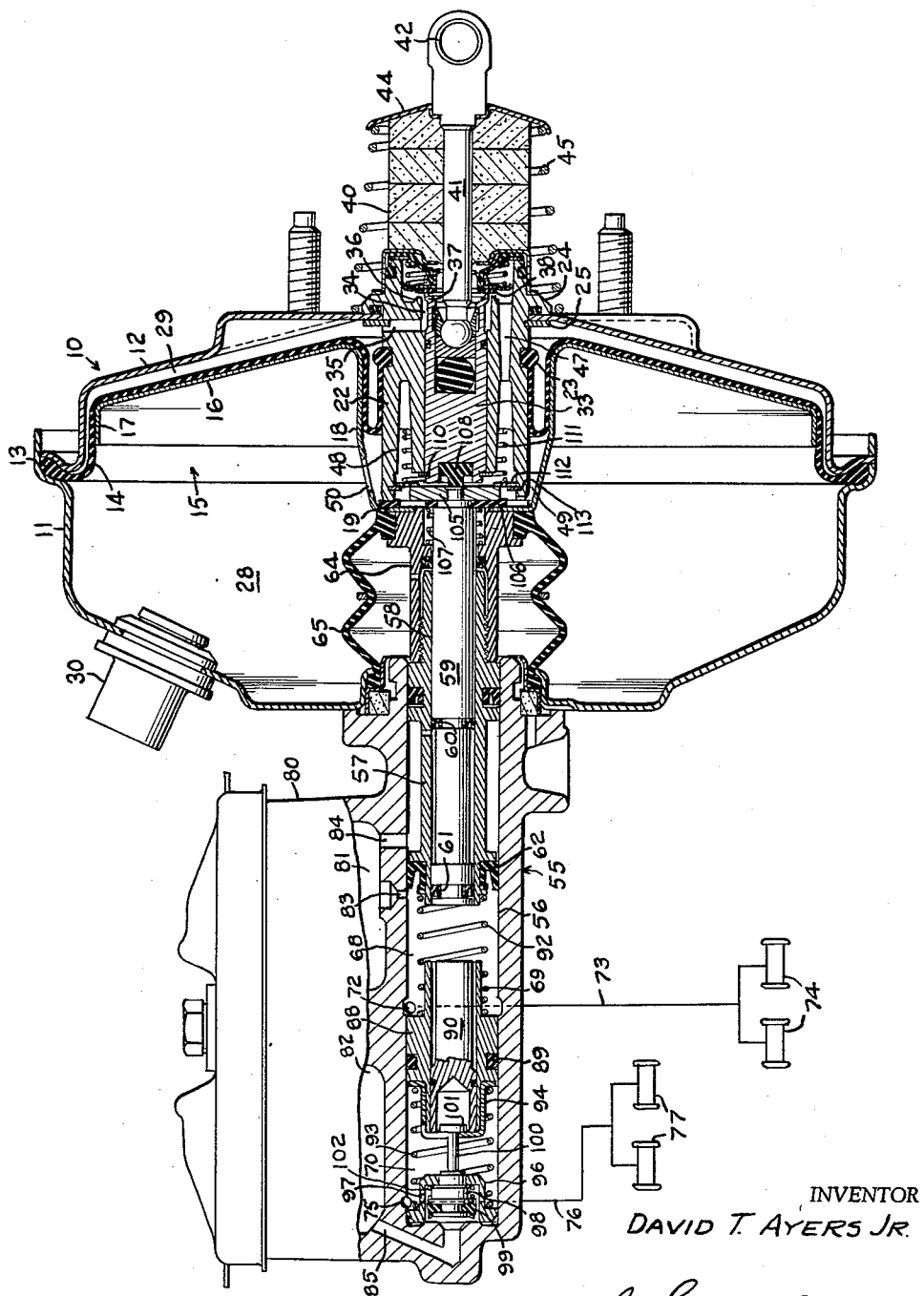
INVENTOR
DAVID T. AYERS JR.
BY 
ATTORNEY United States Patent Office 3,159,975
Patented Dec. 8, 1964

3,159,975
BRAKE OPERATING MECHANISM
David T. Ayers, Jr., Birmingham, Mich., assignor to Kelsey-Hayes Company, Romulus, Mich., a corporation of Delaware
Filed Feb. 3, 1964, Ser. No. 342,125
9 Claims. (Cl. 60—54.6)

This invention relates to a brake operating mechanism, and has particular reference to a dual master cylinder power-operated to displace fluid to the wheel cylinders of motor vehicles to apply the brakes.

It is the common practice to provide pedal controlled fluid pressure operated motors for actuating the plungers of master cylinders to displace fluid into the vehicle wheel cylinders to operate the brakes. These motors may be of any desired type, for example, motors having a follow-through valve operation in which the operator performs part of the work of applying the brakes, or the motor may be of the full-power type wherein the motor performs all of the work of applying the brakes under the control of a valve mechanism operated by the brake pedal in limited movement thereof from a normal off position.

Several types of reaction devices are employed for providing the brake pedal with feel reaction proportional to the degree of brake application. One such type comprises a reaction plunger co-axial with and slidable in the master cylinder plunger and subject to the pressure in the pressure chamber of a master cylinder to oppose valve operation by the brake pedal. This type of reaction device is highly sensitive and accurate in operation for use in a single-chamber master cylinder.

It has become increasingly the practice in recent years to provide dual master cylinders having two pressure chambers, one connected to one set of wheel cylinders and the other connected to the other set of wheel cylinders, so that in the event of a rupture in the brake line leading from one pressure chamber, the other pressure chamber will still be operative for applying the brakes associated therewith.

It is not practicable to use conventional reaction plungers of the type referred to with a tandem master cylinder since the reaction plunger is exposed only to pressure in one of the master cylinder chambers. If pressure in such chamber should fail, due for example to the rupturing of an hydraulic brake line connected thereto, there is no pressure present to react against the brake pedal.

An important object of the present invention is to provide, in combination with a fluid pressure motor mechanism, a dual master cylinder having novel features whereby braking pressures always react against the brake pedal even if there is a failure in pressure in the chamber to which the reaction plunger of the motor is exposed.

A further object is to provide such a construction wherein the secondary piston of a dual master cylinder, actuated by pressure developed in the primary chamber by the motor mechanism, is provided with novel means for transmitting to the reaction plunger of the motor pressures generated in the chamber remote from the motor if pressures should fail in the primary chamber between the plungers of the master cylinder.

A further object is to provide such a mechanism wherein the secondary pressure generating device of the dual master cylinder is made up of an outer plunger sleeve and an inner floating reaction plunger which operate as a unit to generate pressure in the secondary master cylinder and wherein, in the event of a failure in pressure in the primary master cylinder chamber between the two plungers, the floating plunger will engage the reaction plunger of the motor to transmit therethrough reactions proportional to pressures in the secondary master cylinder chamber.

Other objects and advantages of the invention will become apparent during the course of the following description.

In the drawing I have shown one embodiment of the invention. In this showing

The figure is an axial sectional view through the mechanism, a portion of the master cylinder reservoir being shown in section and piping connections to the wheel cylinders being diagrammatically illustrated.

It is pointed out that the motor mechanism shown in the drawing forms per se no part of the invention and may be of any desired type, so long as operation of the valve mechanism is opposed by a reaction plunger associated with the motor, as described below.

The motor is indicated as a whole by the numeral 10 and comprises casing sections 11 and 12 secured together in any suitable manner and clamping therebetween the peripheral bead 13 of a diaphragm 14 forming part of a piston or pressure responsive unit indicated as a whole by the numeral 15. The diaphragm 14 is backed up by a rigid plate 16 having an annular peripheral flange 17 over which the diaphragm 14 is adapted to roll when the motor is operated, as will be obvious. The plate 16 is provided with a forwardly extending co-axial portion 18 terminating at its forward end in an inturned flange 19.

Co-axially within the plate 16 is arranged a stationary valve body 22 grooved to receive the inner bead 23 of the diaphragm 14. The valve body 22 is fixed with respect to the casing section 12 by a flange 24 and a snap ring 25, both engaging the end wall of the casing section 12.

The motor in the present instance is illustrated as being of the vacuum-suspended full-power type. The piston 15 divides the motor casing to form a vacuum chamber 28 and a working chamber 29, normally connected to the chamber 28 as described below, to vacuum suspend the piston 15. A suitable fitting 30 communicates with the motor chamber 28 and is connected by a suitable line (not shown) with a source of vacuum such as the intake manifold of the vehicle engine.

A valve plunger 33 is slidable in the valve body 22 and cooperates with the latter to form a chamber 34 communicating through a port 35 with the motor chamber 29. To the right of the chamber 34 are formed two valve seats 36 and 37, the former being carried by the valve body 22 and the latter by the valve plunger 33. These seats are engageable with a resilient valve 38 which normally engages the valve 37 and which is adapted to engage the seat 36 when the plunger 33 is operated. The valve device is conventional and need not be described in detail.

The inside of the valve seat 37 communicates with the atmosphere through resilient air cleaning elements 40 within which extends a push rod 41 having a pivot opening 42 for connection with a brake pedal (not shown). The left-hand end of the push rod 41 is connected in any suitable manner, for example, by the means shown in the drawing, with the valve plunger 33 to move the latter upon operation of the brake pedal. The air cleaning elements 40 are retained in position by a plate 44 engaging the push rod and biased to the right by a spring 45 to return the push rod 41 to normal position when the brake pedal is released.

The valve 38 is normally disengaged from the seat 36, in which case the chamber 34 communicates with a passage 47 opening into a concentric groove 48 formed in the valve body 22. This groove communicates with a space 49 within the forward end of the plate extension 18, such extension having an opening 50 communicating with the vacuum motor chamber 28. Thus, the motor chambers 28 and 29 are normally in communication with each other to vacuum suspend the motor.

The master cylinder adapted to be operated by the motor mechanism is indicated as a whole by the numeral 55 and has formed therewithin a bore 56. A primary plunger 57 is slidable in the right-hand end portion of the bore 56 and is provided therewithin with a bore 58 in which is slidable a reaction plunger 59 sealed in the bore 58 as at 60 and 61. The plunger 57 is conventionally sealed in the bore 56 as at 62.

The plunger 57 has a rear section 64 threaded thereon and arranged within a bellows boot 65, the forward end of which is connected to the motor casing 11 and the rear end of which is connected to the plunger extension 64.

The plunger 57 defines one end of a pressure chamber 68 in the master cylinder, and the other end of this chamber is defined by a secondary plunger indicated as a whole by the numeral 69. The plunger 69 forms with the left-hand end of the master cylinder a second pressure chamber 70. The chamber 68 is provided with a port 72 connected with an hydraulic line 73 leading to one set of wheel cylinders 74. The chamber 70 is similarly provided with an outlet opening 75 connected by an hydraulic line 76 to the remaining wheel cylinders 77. The outlet openings 72 and 75 will be provided with conventional residual pressure valves (not shown).

The master cylinder is provided with a divided reservoir 80 having chambers 81 and 82, the former of which communicates with the pressure chamber 68 through a compensating port 83 just ahead of the seal 62. The chamber 81 also communicates through the usual port 84 with the bore 56 back of the head of the plunger 57. The chamber 82 communicates with the left-hand end of the bore 56 through a passage 85 to replenish fluid in the chamber 70 in a manner to be described.

The plunger 69 comprises an outer sleeve-like plunger element 88 sealed in the bore 56 by an O-ring 89. Within the plunger element 88 is arranged a floating reaction plunger 90 projecting through both ends of the plunger element 88. A spring 92 in the pressure chamber 68 tends to move the plungers 57 and 69 away from each other. A similar spring 93 is arranged in the chamber 70 and engages at one end with a cap-shaped spring seat 94 mounted on the plunger element 88 to bias the latter toward the right. The other end of the spring 93 engages a cup 96 having an opening 97 to connect the interior of the cup 96 to the chamber 70. Within the cup 96 is arranged a head 98 carrying a resilient valve 99 engageable with but normally unseated from the adjacent end of the master cylinder so that the reservoir chamber 82 normally communicates with the pressure chamber 70 through passage 85 and opening 97.

The head 98 is carried by a stem 100 projecting through the spring seat 94 and having a head 101 engaging the end of the spring seat to exert a pull on the stem 100 to normally unseat the valve 99. A small spring 102 within the cup 96 biases the valve 99 to closed position, to which position it moves when the head 101 is released by movement of the plunger 69 toward the left, as further described below.

Within the motor 10, a plate 105 is riveted to a reduced end of the plunger 59 and between such plate and the plunger is interposed an apertured rubber or similar washer 106 biased to the right by a spring 107. The valve plunger 33 is provided with a cushion 108 having a reduced end engageable with the reduced adjacent end of the plunger 59.

Movement of the valve plunger 33 to the right in FIGURE 1 is limited by a snap ring 110, and it will be apparent that movement of the valve plunger 33 to the left initially takes place relatively freely because of the ready deformability of the cushion 108. The plate 105 is adapted, after slightly deforming the cushion 108, to engage the valve plunger 33 to transmit reaction forces from the plunger 59 to the valve plunger 33. A counter-reaction spring 111 initially opposes such movement of the plate 105, this spring engaging at one end against the valve body 22 and at its other end against an apertured washer 112 seating against a snap ring 113 carried by the valve body 22.

*Operation*

As previously stated, the motor per se forms no part of the present invention except in combination, to provide means for operating the master cylinder and to transmit reaction to the brake pedal. The parts normally occupy the positions shown in the drawing, and the mechanism is operated by depressing the brake pedal (not shown) to move the push rod 41 to the left. The air cleaner 40 is highly compressible or deformable so as to permit full operation of the push rod. Initial movement of the push rod 41 moves the valve plunger 33, the valve seat 37 moving to the left followed by the valve 38 until this valve engages both seats 36 and 37. The valve elements are now in lap positions and this movement takes place without appreciable force being applied to the valve plunger 33 because of the resiliency of the cushion 108.

As previously stated, the motor is vacuum-suspended, and when the valve 38 engages the seat 36, the motor chamber 29 is cut off from its connection with the vacuum motor chamber 28. Slight further movement beyond the lap valve position moves the valve seat 37 away from the seat 38, in which case the chamber 34 will be opened to atmospheric pressure through the air cleaner 40. Accordingly, air flows into the motor chamber 29 to actuate the piston or pressure responsive unit 15.

Movement of the piston 15 to the left actuates the plunger 57. The resilient washer 106 seats against the plate 105, and the spring 107 prevents friction between the plungers 57 and 59 from initially moving the latter.

During the initial stage of brake operation, it requires little force to generate pressure in the chambers 68 and 70 since such initial brake operation consists only in moving the brake shoes into contact with the drums.

The generation of pressure in the chamber 68 displaces fluid into the wheel cylinders 74 and effects movement of the plunger 69 to generate pressure in the chamber 70. Fluid from the latter chamber is supplied to the wheel cylinders 77. It will be apparent that pressure in the chamber 68 acts against both of the plunger elements 88 and 90 to generate pressure in the chamber 70.

As motor operation takes place, pressure in the chamber 68 acts to the right against the reaction plunger 59 and this pressure, up to a predetermined point, is absorbed by the counter-reaction spring 111. There is a gap between the plate 105 and valve plunger 33, and when pressure in the chamber 68 is sufficient to overcome the loading of the spring 111, the plate 105 engages the end of the valve plunger 33 to resist its movement and thus react against the brake pedal to a degree proportional to pressure in the chamber 68. This pressure is substantially the same as the pressure in the chamber 70, and accordingly, the drive is apprised through the "feel" of the brake pedal, of the degree of brake application. As soon as the brake shoes engage the drums, there is an immediate increase in pressure in the chambers 68 and 70, and this increased pressure provides increased reaction against the brake pedal, always proportionate to hydraulic braking pressures.

A number of motor mechanisms have been developed employing axial reaction plungers such as the plunger 59, and these are wholly practicable for use in conventional single-chamber master cylinders. However, this type of reaction device is not practicable in dual master cylinders, which are coming more and more into common use to provide separate hydraulic systems to the front and rear wheels of a vehicle. Such systems are used so that if pressure fails in one master cylinder chamber, pressure can still be developed in the other chamber to apply the brakes of two wheels. However, with such a system, if a line similar to the line 73 should rupture so that no pressure can be developed in a master cylinder chamber corresponding to the chamber 68, no reaction will be transmitted to the operator.

With the present mechanism, reaction is provided even if pressure should fail in the chamber 68. It will be noted that the left-hand end of the plunger 57 is the same in diameter as the right-hand end of the plunger element 88. Therefore, if pressure should fail in the chamber 68, the plunger 57 will advance and engage the plunger element 88 to generate pressure in the chamber 70 to operate the wheel cylinders 77. At the same time, the left-hand end of the plunger 59 will engage the right-hand end of the floating plunger 90 so that this plunger becomes, in effect, a part of the plunger 59. Pressures thereafter developed in the chamber 70, acting to the right against the left-hand end of the floating plunger 90, will transmit reaction pressures through the plunger 59 and through the valve plunger 33 and push rod 41 to the brake pedal in exactly the same manner as pressure is transmitted from the chamber 68 under normal operating conditions.

Quite obviously, when the plunger 57 is initially operated, it closes the replenishing port 83 and movement of the plunger 69 to the left releases the head 101 so that the valve 99 closes the adjacent end of the passage 85. The valve 99 partakes of only limited movement to closed position and the head 101 is free of the valve seat 94 during the generation of pressures in the chamber 70.

Of course, if pressures should fail in the chamber 70, operation of the plunger 57 will simply cause the plunger 69 to move to its limit of movement. Thereafter, pressure will be generated in the chamber 68 and such pressure will act against the plunger 59 in the same manner as described.

The motor has been shown as being of the full-power type, the valve body 22 being fixed to the casing section 12. In the event of a failure of power in the motor, however, the valve plunger 33 may be pedal-operated to transmit force from the valve plunger 33 through the plate 105 and washer 106 to the plunger extension 64 to pedal-operate the plunger 57. The plunger 59 will be similarly operated and pedal pressures will be effective for generating brake applying pressures in the chambers 68 and 70.

From the foregoing, it will be apparent that the present system renders practicable the use of an axial reaction plunger for transmitting reaction pressures to the pedal when the motor is used in conjunction with a dual master cylinder. Regardless of the failure of the mechanism to develop pressure in either master cylinder chamber 68 or 70, accurate reaction pressures will still be transmitted to the brake pedal.

It is to be understood that the form of the invention shown and described is to be taken as a preferred example of the same, and that various changes in the shape, size and arrangement of the parts may be made as do not depart from the spirit of the invention or the scope of the appended claims.

I claim:

1. A pressure generating mechanism for motor vehicle brakes comprising a master cylinder, a primary plunger projecting into one end of said master cylinder, a secondary plunger in said master cylinder between said primary plunger and the other end of said master cylinder, said plungers forming therebetween a primary chamber connected to one set of wheel cyilnders, said secondary plunger forming with said other end of said master cylinder a secondary chamber connected to the other vehicle wheel cylinders, a fluid pressure motor for actuating said primary plunger and having a valve mechanism for controlling the connection of said motor to a pressure source to operate it, said valve mechanism including a manually operable member, reaction means for transmitting pressures from said primary chamber to said manually operable member, said primary plunger being movable to engage and operate said secondary plunger upon a failure in pressure in said primary chamber, and means operative upon a failure of pressure in said primary chamber for transmitting pressure from said secondary chamber to said reaction means to oppose movement of said manually operable member.

2. A pressure generating mechanism for motor vehicle brakes comprising a master cylinder, a primary plunger projecting into one end of said master cylinder, a secondary plunger in said master cylinder between said primary plunger and the other end of said master cylinder, said plungers forming therebetween a primary chamber connected to one set of wheel cylinders, said secondary plunger forming with said other end of said master cylinder a secondary chamber connected to the other vehicle wheel cylinders, a fluid pressure motor for actuating said primary plunger and having a valve mechanism for controlling the connection of said motor to a pressure source to operate it, said valve mechanism including a manually operable member, a reaction plunger axially slidable in said primary plunger, said reaction plunger being open to pressure in said primary chamber and engageable with said manually operable member to oppose operation of the latter in accordance with pressure in said primary chamber, said primary plunger being movable to engage and operate said secondary plunger upon a failure in pressure in said primary chamber, and means operative upon a failure of pressure in said primary chamber for transmitting pressure from said secondary chamber to said reaction plunger to oppose movement of said manually operable member.

3. A pressure generating mechanism for motor vehicle brakes comprising a master cylinder, a primary plunger projecting into one end of said master cylinder, a secondary plunger in said master cylinder between said primary plunger and the other end of said master cylinder, said plungers forming therebetween a primary chamber connected to one set of wheel cylinders, said secondary plunger forming with said other end of said master cylinder a secondary chamber connected to the other vehicle wheel cylinders, a fluid pressure motor for actuating said primary plunger and having a valve mechanism for controlling the connection of said motor to a pressure source to operate it, said valve mechanism including a manually operable member, a reaction plunger axially slidable in said primary plunger, said reaction plunger being open to pressure in said primary chamber and engageable with said manually operable member to oppose operation of the latter in accordance with pressure in said primary chamber, said primary plunger being movable to engage and operate said secondary plunger upon a failure in pressure in said primary chamber, and a floating plunger axially slidable in said secondary plunger and forming a part of the latter for generating pressure in said secondary chamber, said floating plunger being engageable with said reaction plunger when said primary and said secondary plungers are engaged with each other to transmit pressure from said secondary chamber to said reaction plunger to oppose movement of said manually operable member.

4. A pressure generating mechanism for motor vehicle brakes comprising a master cylinder, a primary plunger projecting into one end of said master cylinder, a secondary plunger in said master cylinder between said primary plunger and the other end of said master cylinder, said plungers forming therebetween a primary chamber connected to one set of wheel cylinders, said secondary plunger forming with said other end of said master cylinder a secondary chamber connected to the other vehicle wheel cyilnders, said secondary plunger comprising a sleeve-like plunger element and a floating axial plunger therein combining therewith to operate as a unit to generate pressure in said secondary chamber, said floating plunger being movable axially relative to said sleeve-like element, a fluid pressure motor for actuating said primary plunger and having a valve mechanism, including a manually operable element, for controlling the supply of pressure from a source to said motor, and reaction means for transmitting pressures from said primary chamber to said manually operable member, said primary plunger being movable to engage and operate said secondary plunger upon a failure in pressure in said primary chamber, said floating plunger being engageable with said reaction means when said primary and secondary plungers engage each other, for transmitting pressure from said secondary chamber to said reaction means to oppose movement of said manually operable member.

5. A pressure generating mechanism for motor vehicle brakes comprising a master cylinder, a primary plunger projecting into one end of said master cylinder, a secondary plunger in said master cylinder between said primary plunger and the other end of said master cylinder, said plungers forming therebetween a primary chamber connected to one set of wheel cylinders, said secondary plunger forming with said other end of said master cylinder a secondary chamber connected to the other vehicle wheel cylinders, said secondary plunger comprising a sleeve-like plunger element and a floating axial plunger therein combining therewith to operate as a unit to generate pressure in said secondary chamber, said floating plunger being movable axially relative to said sleeve-like element, a fluid pressure motor for actuating said primary plunger and having a valve mechanism, including a manually operable element, for controlling the supply of pressure from a source to said motor, a reaction plunger axially slidable through said primary plunger, said reaction plunger having one end exposed to pressure in said primary chamber and its other end engageable with said manually operable member to transmit to the latter pressures in said primary chamber, said floating plunger being engageable with said reaction plunger when said primary and secondary plungers engage each other for transmitting pressure from said secondary chamber to said reaction plunger to oppose movement of said manually operable member.

6. A mechanism according to claim 5 wherein said floating plunger extends entirely through said plunger element, a cup-like spring seat engaging the end of said plunger element in said secondary chamber and engaged by said floating plunger, and a spring engaging said plunger element to urge it towards said primary plunger.

7. A mechanism according to claim 5 wherein said floating plunger extends entirely through said plunger element, a cup-like spring seat engaging the end of said plunger element in said secondary chamber and engaged by said floating plunger, a spring engaging said plunger element to urge it toward said primary plunger, a replenishing port communicating axially with said secondary chamber, a normally open valve for closing said port, such valve being biased to closed position, and a stem connected between said valve and said spring seat to maintain said valve in open poistion when said secondary plunger is in normal position.

8. A pressure generating mechanism for motor vehicle brakes comprising a master cylinder, a primary plunger projecting into one end of said master cylinder, a secondary plunger in said master cylinder between said primary plunger and the other end of said master cylinder, said plungers forming therebetween a primary chamber connected to one set of wheel cylinders, said secondary plunger forming with said other end of said master cylinder a secondary chamber connected to the other vehicle wheel cylinders, a fluid pressure motor for actuating said primary plunger and having a valve mechanism for controlling the connection of said motor to a pressure source, said valve mechanism including a manually operable member co-axial with said primary plunger, a reaction plunger in said primary plunger co-axial therewith, said reaction plunger having one end exposed to said primary chamber and having its other end engageable with said manually operable member, a plate carried by said other end of said reaction plunger and engageable with said primary plunger to transmit movement thereto from said manually operable member upon a failure in pressure in said source, a counter-reaction spring engaging said plate to prevent reaction movement thereof until reaction forces on said reaction plunger increase to a predetermined extent, and means operative upon a failure of pressure in said primary chamber for transmitting pressure from said secondary chamber to said reaction plunger to oppose movement of said manually operable member.

9. A mechanism according to claim 8 wherein said last-named means comprises a floating plunger in said secondary plunger co-axial with said reaction plunger and engageable therewith, when said primary plunger engages said secondary plunger, to transmit reaction from said secondary chamber to said reaction plunger.

No references cited.